United States Patent

Tilli

[11] 3,881,213
[45] May 6, 1975

[54] BLADE CARRIER FOR THE WINDSHIELD WIPERS OF MOTOR VEHICLES

[75] Inventor: Lodovico Tilli, Turin, Italy

[73] Assignee: Bre Landiere S.A.

[22] Filed: Mar. 2, 1973

[21] Appl. No.: 337,494

[30] Foreign Application Priority Data
Mar. 24, 1972 Italy .................................. 22354/72
May 4, 1972 Italy .................................. 23901/72

[52] U.S. Cl. .......................................... 15/250.42
[51] Int. Cl. ........................... B60s 1/04; B60s 1/38
[58] Field of Search....... 18/250.36, 250.42, 250.35, 18/250.37, 250.38, 250.39, 250.40, 250.41

[56] References Cited
UNITED STATES PATENTS
3,104,412 9/1963 Hinder ........................ 15/250.42
3,121,903 2/1964 Ludwig ........................ 15/250.42
3,427,637 2/1969 Quinlan et al. ................ 15/250.42

FOREIGN PATENTS OR APPLICATIONS
1,929,321 2/1970 Germany .................... 15/250.42

Primary Examiner—Peter Feldman
Attorney, Agent, or Firm—Ladas, Parry, Von Gehr, Goldsmith & Deschamps

[57] ABSTRACT

A blade carrier for the windshield wipers of motor vehicles comprising a bowed rod of flexible plastic material having on one face hook shaped teeth forming a holding groove for the foot of the wiping blade. Means are provided for facilitating the introduction of said foot in said holding groove.

3 Claims, 9 Drawing Figures

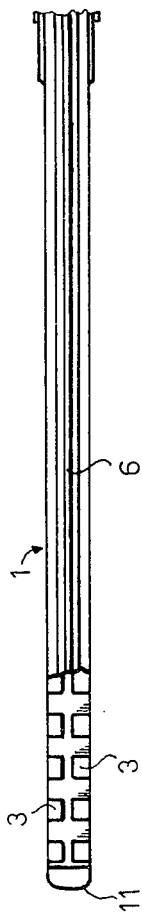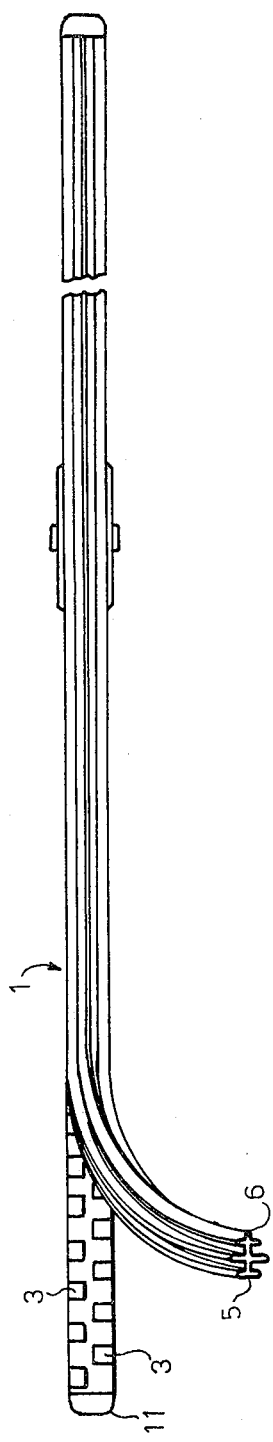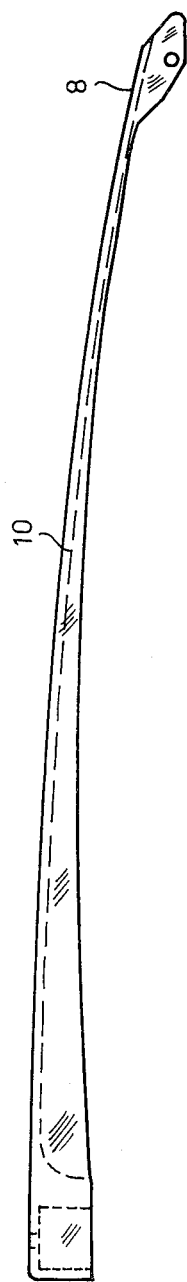
FIG. 5
FIG. 4
FIG. 6

BLADE CARRIER FOR THE WINDSHIELD WIPERS OF MOTOR VEHICLES

The present invention relates to a blade carrier for the windshield wipers of motor vehicles.

The blade carriers for windshield wipers of motor vehicles, at present used, consist generally of metal and structurally comprise a sheath into which the blade is inserted. Said sheath can be directly articulately connected to the arm of the windshield wiper, or it can be mounted on a leaf spring unit.

Known windshield wipers the sheath of which is directly articulated to the arm can be assembled only on motor vehicles the windshield of which is perfectly flat, and this at present occurs almost exclusively on vehicles of industrial type.

The windshield wipers mounted on a leaf spring unit can be assembled also on motor vehicles having a curved or bowed windshield, as it is used at present on almost all motor vehicles.

Of course the presence of this unit of leaf springs renders the manufacture of the structure of the windshield wiper relatively complex and expensive.

The purpose of the present invention is that of embodying a blade carrier for windshield wiper of motor vehicles which can be indifferently adapted to the substantially flat windshields and to the bowed windshields, said blade carrier being furthermore easily and economically manufactured, reducing the number of the component parts.

According to the invention a blade carrier is provided for a windscreen wiper of a motor vehicle, comprising (a) an elongated body for connection to a wiper arm, said body being formed as a single arcuate piece of an elastically flexible plastic material having retaining members on its concave side arranged to define a holding groove for receiving and retaining the rear portion of a windscreen wiper blade, (b) means for retaining the ends of the windscreen wiper blade, said retaining members defining said holding groove for the wiper blade being spaced from said means for retaining the ends of the wiper blade at at least one end of the blade carrier over a distance greater than that separating adjacent retaining members, whereby the rear portion of the blade may be inserted by way of the space into the holding groove and slid along. Preferably at at least one end of the blade carrier, at least one upstanding tooth is provided on each side of the line of the holding groove between the retaining members and said means for retaining the ends of the blade.

This contrivance remarkably reduces the time requested for assembling the blade on the blade carrier, with an evident economic advantage.

In order to better understand the features of this invention, an exemplary specification will be made hereinafter with reference to the attached drawings, wherein:

FIG. 4 is a view from down upwards of the blade carrier, with the blade partially removed therefrom;

FIG. 5 is a view from down upwards showing partially a different embodiment of the blade carrier;

FIG. 6 is a side view showing an arm which can be connected to the blade carrier according to this invention;

With reference to the drawings, the structure of the blade carrier according to this invention consists of a single body rod shown generally by 1, formed in a single piece of elastically relatively flexible plastic material, having a slightly bowed shape, which can be adapted to any bowing of the windshield to be wiped.

Figure 3:
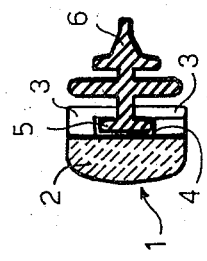
FIG. 3 is a cross sectional view taken along the plane III—III of FIG. 2.

The rod 1 has a body 2, with a substantially rectangular cross sectional shape, from the underside of which project a plurality of hook shaped opposed teeth 3 (FIGS. 3 and 5), so as to form a holding groove 4. Said teeth have a portion which extends at right angles from the underside of the rod 1, and a projecting portion extending parallel to said underside.

The teeth 3 can also be staggered with respect to one another, for molding reasons, as shown in FIG. 4.

Into the groove 4 defined by said teeth 3, the foot 5 of a blade 6 for a conventional windshield wiper, can be easily inserted.

At the middle point 7 of the rod 1 a connection lug 8 also made of plastic material is pivoted, to which the arm of the windshield wiper is destined to be engaged in 9. As it is clearly shown in FIG. 6, said lug 8 can be obtained in a single piece with the arm 10, with a further resulting economy of cost, particularly in the factory.

Furthermore, the pins 7 can be obtained bodily with the rod 1, and the lug 8 can snap engage said pins.

Figure 1:
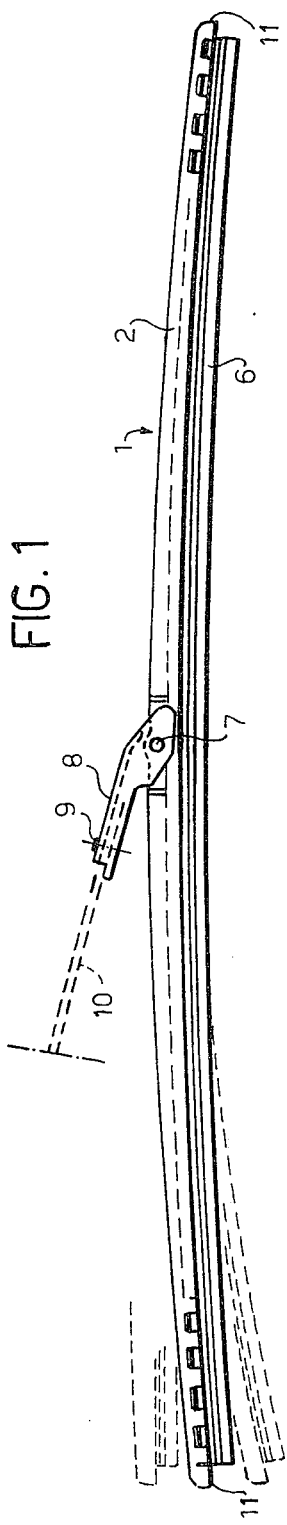
FIG. 1 is a side view showing the blade carrier embodied according to this invention.
Figure 2:
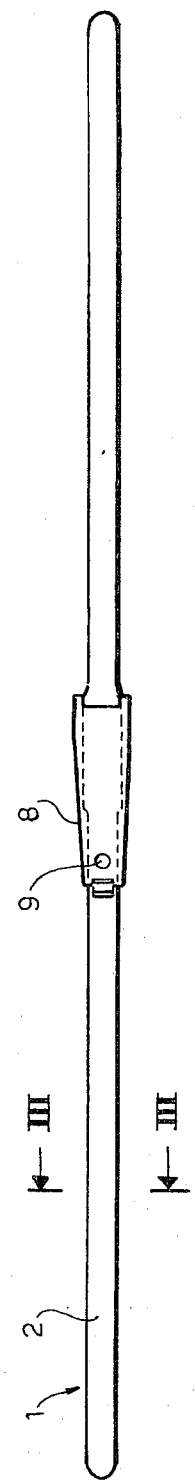
FIG. 2 is a top plan view of the same blade carrier as shown in FIG. 1.

The rod 1 has a substantially triangular longitudinal section in both directions starting from the middle point 7 where the lug 8 is pivoted (FIG. 1) so as to have a decreasing cross sectional area from its centre towards its ends.

The above contrivance serves to allow a uniform distribution of the load onto the lip of the blade contacting the glass (an average load for a correct operation is about 40 grams for 25 mm length of the rod 1).

The rod 1 has also terminal holding members 11, the purpose of which is to prevent the blade 6 from freely escaping from the holding groove 4 where it is inserted by exploiting the elasticity of the wiping member. Thereby the use of the usual auxiliary holding means will be dispensed with.

Figure 7:
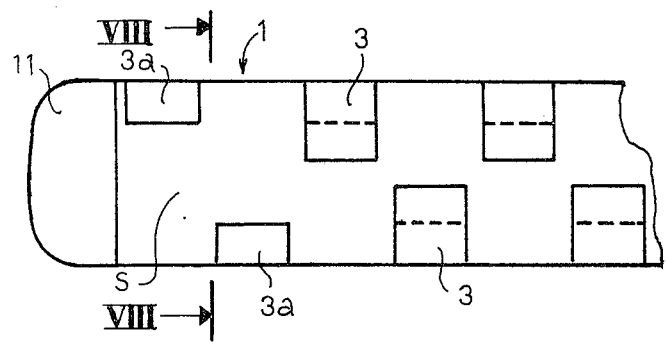
FIG. 7 is a detail in view from down upwards showing the modified blade carrier, without the blade, according to a first possible embodiment.
Figure 8:
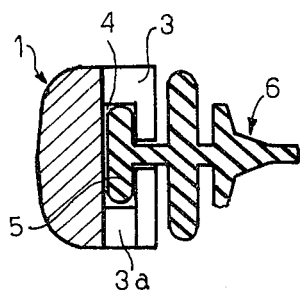
FIG. 8 is a cross sectional view taken along the plane VIII—VIII of FIG. 7 showing said blade carrier complete with its blade.
Figure 9:
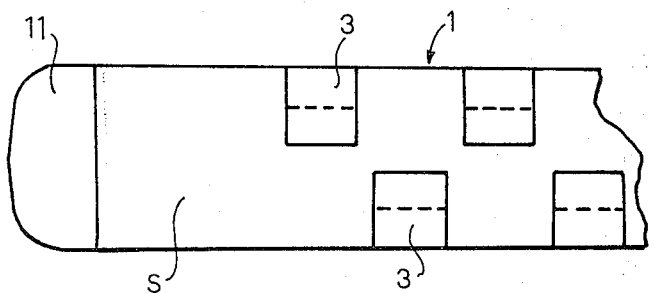
FIG. 9 is a detail viewed from down upwards showing another possible variant which can be adopted for the blade carrier according to this invention.

With reference to FIGS. 7, 8 and 9, between the holding member 11 and the first holding teeth, in correspondence with at least one end of the rod 1, a free space S will be created in order to allow the operator to easily introduce the foot 5 of the blade 6 into the holding groove 4 formed by the teeth themselves.

This space can be created by embodying, for instance, the first two teeth adjacent to the terminal holding member 11, with the sole part at right angles 3a (FIGS. 7 and 8) or by suitably spacing apart the first holding tooth from said terminal holding member (FIG. 9).

The portion 3a at right angles shows the advantage of better holding the blade in place.

Of course the above described modifications might be made at both ends of the rod 1.

Having thus described my invention, I claim:

1. A blade carrier for a windscreen wiper of a motor vehicle, comprising (a) an elongated body for connection to a wiper arm, said body being formed as a single arcuate piece of an elastically flexible plastic material having a first plurality of hook-shaped retaining members spaced apart from one another along the concave side of said body, and a second plurality of hook-shaped retaining members spaced apart from one another along said concave side and arranged to define with said first plurality a holding groove for receiving and retaining the rear portion of a conventional windscreen wiper blade, and (b) first and second terminal holding means at opposite respective ends of the blade carrier for retaining the ends of the windscreen wiper blade, that hook-shaped retaining member which is nearest the first terminal holding means being spaced from said first terminal holding means by a distance greater than that separating adjacent hook-shaped retaining members of the first or second plurality, whereby a space is provided between said first terminal holding means and the hook-shaped retaining member nearest thereto so that the rear portion of the blade may be inserted by way of said space into the holding groove and slid along the holding groove.

2. A blade carrier according to claim 1, in which an upstanding, non-hooked tooth is provided between the first terminal holding means and that retaining member of the first plurality which is nearest thereto and an upstanding, non-hooked tooth is provided between the first terminal holding means and that retaining member of the second plurality which is nearest thereto, the two teeth being on opposite respective sides of the line of the holding groove .

3. A blade carrier according to claim 1, in which an upstanding, non-hooked tooth is provided between the second terminal holding means and that retaining member of the first plurality which is nearest thereto and an upstanding, non-hooked tooth is provided between the second terminal holding means and that retaining member of the second plurality which is nearest thereto, the two teeth being on opposite respective sides of the line of the holding groove.

* * * * *